United States Patent Office 3,278,317
Patented Oct. 11, 1966

3,278,317
VANADIUM PENTOXIDE-METAL META-PHOSPHATE GLASS COMPOSITIONS
Gerald E. Blair, Goleta, Calif., and David P. Hamblen, Gates, and Robert A. Weidel, Webster, N.Y., assignors to Bausch & Lomb Incorporated, Rochester, N.Y., a corporation of New York
No Drawing. Filed Mar. 18, 1963, Ser. No. 266,062
10 Claims. (Cl. 106—47)

This invention relates to novel ceramic compositions and more particularly to vitreous compositions which have relatively low electrical resistivities.

The increased interest in ceramic semi-conductors has led to several studies of the electrical properties of various ceramic compositions. Such studies have indicated that glass compositions which contain high percentages of vanadium oxide produce glasses which have characteristic low resistivities. Glasses of this type have been disclosed in the British Patents 744,205 and 744,947 which were published on February 1, 1956 and February 15, 1956 respectively.

Various tests on the vanadium phosphate glasses previously disclosed showed that such glasses were relatively difficult to produce, except in relatively small melts, i.e. melts substantially less than 500 grams. An increase in phosphorus pentoxide ($P_2O_5$) with a corresponding decrease in vanadium oxide was effective in producing a glass composition which was more resistant to devitrification but which had less desirable electrical properties.

The novel composition according to the present invention may be produced without the necessity of adding phosphorous pentoxide or other highly volatile materials. Replacing these volatile materials with a more stable composition has been found to improve the reproducibility of the glasses, simplify the handling technique and to facilitate melting the compositions.

It has now been found that a ceramic composition containing up to 85 weight percent vanadium oxide could be reacted with at least one metaphosphate selected from the group consisting of barium, lead, lithium, sodium, cadmium, vanadium and potassium. The resulting glass has good optical properties and may be produced in 500 gram melts or larger. Glasses of this type are particularly useful not only because they exhibit low electrical conductivity but also because it has been found that vitreous samples may be treated according to a method set forth in our copending application, entitled "Method of Changing the Conductivity of Ceramic Materials," Serial No. 265,636, filed March 18, 1963 in order to produce various amounts of devitrification to thereby produce a second relatively large change in the specific resistivity.

The following examples illustrate various phases of the invention:

| Compound | Mole percent | Weight percent | Specific Resistivity at 27° |
|---|---|---|---|
| Example 1: | | | |
| $V_2O_5$ | 66.52 | 75.0 | 239K. |
| $KPO_3$ | 33.48 | 25.0 | |
| Example 2: | | | |
| $V_2O_5$ | | 69.5 | 190K. |
| $KPO_3$ | | 30.5 | |
| Example 3: | | | |
| $V_2O_5$ | | 62.1 | 1700K. |
| $Ba(PO_3)_2$ | | 37.9 | |
| Example 4: | | | |
| $V_2O_5$ | | 65.0 | 793K. |
| $Ba(PO_3)_2$ | | 35.0 | |
| Example 5: | | | |
| $V_2O_5$ | | 70.0 | 240K. |
| $Ba(PO_3)_2$ | | 30.0 | |
| Example 6: | | | |
| $V_2O_5$ | | 75.0 | 93K. |
| $Ba(PO_3)_2$ | | 25.0 | |
| Example 7: | | | |
| $V_2O_5$ | 72.0 | 76.0 | 186K. |
| $Ba(PO_3)_2$ | 28.0 | 24.0 | |
| Example 8: | | | |
| $V_2O_5$ | | 80.0 | 19K. |
| $Ba(PO_3)_2$ | | 20.0 | |
| Example 9: | | | |
| $V_2O_5$ | | 55.0 | 1800K. |
| $Pb(PO_3)_2$ | | 45.0 | |
| Example 10: | | | |
| $V_2O_5$ | | 60.0 | 920K. |
| $Pb(PO_3)_2$ | | 40.0 | |
| Example 11: | | | |
| $V_2O_5$ | | 65.0 | 470K. |
| $Pb(PO_3)_2$ | | 35.0 | |
| Example 12: | | | |
| $V_2O_5$ | 70.42 | 70.0 | 57K. |
| $Pb(PO_3)_2$ | 29.58 | 30.0 | |
| Example 13: | | | |
| $V_2O_5$ | | 77.7 | 690K. |
| $LiPO_3$ | | 22.3 | |
| Example 14: | | | |
| $V_2O_5$ | | 80.0 | 480K. |
| $LiPO_3$ | | 20.0 | |
| Example 15: | | | |
| $V_2O_5$ | 71.90 | 84.0 | 10K. |
| $LiPO_3$ | 28.10 | 16.0 | |
| Example 16: | | | |
| $V_2O_5$ | | 73.6 | 670K. |
| $NaPO_3$ | | 26.4 | |
| Example 17: | | | |
| $V_2O_5$ | 63.22 | 75.0 | 626K. |
| $NaPO_3$ | 36.78 | 25.0 | |
| Example 18: | | | |
| $V_2O_5$ | | 65.0 | 39K |
| $Cd(PO_3)_2$ | | 35.0 | |
| Example 19: | | | |
| $V_2O_5$ | | 70.0 | 27K. |
| $Cd(PO_3)_2$ | | 30.0 | |
| Example 20: | | | |
| $V_2O_5$ | | 75.0 | 10K. |
| $Cd(PO_3)_2$ | | 25.0 | |
| Example 21: | | | |
| $V_2O_5$ | | 76.4 | |
| $Mg(PO_3)_2$ | | 23.6 | |
| Example 22: | | | |
| $V_2O_5$ | | 60 | 870K. |
| $V_2O_3:3P_2O_5$ (Vanadous metaphosphate). | | 40 | |
| Example 23: | | | |
| $V_2O_5$ | | 70 | 320K. |
| $V_2O_3:3P_2O_5$ | | 30 | |
| Example 24: | | | |
| $V_2O_5$ | | 80 | 49K. |
| $V_2O_3:3P_2O_5$ | | 20 | |

Generally the preparation of compositions according to the present invention may be accomplished in various ways. For example, the ingredients in the powdered form are mixed and placed in a platinum crucible. The crucible containing the mixture is placed in an electric resistance furnace and the ingredients are melted therein at a temperature of approximately 900° C. Relatively small melts were made in this manner and were held at this temperature for approximately 3–4 hours. Larger melts were also made at this same temperature, however, were stirred according to conventional glass making techniques for approximately 4 hours. The smaller melts were cast at approximately 900° C. on a plate having a temperature of approximately 100° C. In the case of the larger melts the melt was cooled to approximately 700° C. with continued stirring prior to casting on a plate of about 100° C. All types of the glass disclosed herein were annealed at approximately 250° C.

Glasses according to the present invention have transmission characteristics which are generally similar to conventional phosphate glasses. It has been found however, that the absorption of visible light increases as the vanadium content is increased and if the vanadium content is further increased this absorption extends into the infrared portion of the spectrum. It was noted however, that there was little or no effect on the longer wavelengths, i.e. 4–5µ wavelength.

The ingredients called for in the examples may be added in various forms. The vanadium oxide $V_2O_5$ was selected for the present examples in view of its commercial availability. It should also be understood that various glass modifiers may be added to the compositions disclosed herein without departing from the spirit or scope of the present invention.

We claim:
1. A glass composition consisting essentially of vanadium pentoxide and a compound selected from the group consisting of barium metaphosphate, lead metaphosphate, lithium metaphosphate, sodium metaphosphate, cadmium metaphosphate, potassium metaphosphate and vanadium metaphosphate.

2. A glass composition according to claim 1 including 55–85 weight percent vanadium pentoxide and 15–45 weight percent of a compound selected from the group consisting of barium metaphosphate, lead metaphosphate, lithium metaphosphate, sodium metaphosphate, cadmium metaphosphate, potassium metaphosphate and vanadium metaphosphate.

3. A glass composition consisting essentially of vanadium pentoxide and potassium metaphosphate.

4. A glass composition consisting essentially of vanadium pentoxide and barium metaphosphate.

5. A glass composition consisting essentially of vanadium pentoxide and lead metaphosphate.

6. A glass composition consisting essentially of vanadium pentoxide and lithium metaphosphate.

7. A glass composition consisting essentially of vanadium pentoxide and sodium metaphosphate.

8. A glass composition consisting essentially of vanadium pentoxide and cadmium metaphosphate.

9. A glass composition consisting essentially of vanadium pentoxide and magnesium metaphosphate.

10. A glass composition consisting essentially of vanadium pentoxide and vanadous metaphosphate.

References Cited by the Examiner

UNITED STATES PATENTS 3,241,009   3/1966   Dewald et al. _____ 317—234

FOREIGN PATENTS 744,947   2/1956   Great Britain.

TOBIAS E. LEVOW, *Primary Examiner.*

H. McCARTHY, *Assistant Examiner.*